:::

United States Patent Office 3,657,341
Patented Apr. 18, 1972

3,657,341
ACETYL GLYCINE AMIDES
David E. Thorne, Crowthorne, England, assignor to Beecham Group Limited, Brentford, England
No Drawing. Filed May 21, 1969, Ser. No. 826,652
Claims priority, application Great Britain, June 4, 1968, 26,602/68, 26,612/68
Int. Cl. C07c 103/22
U.S. Cl. 260—558 A   4 Claims

ABSTRACT OF THE DISCLOSURE

Substituted acetyl glycine amides, their preparation and formulation for use as analeptics and anticonvulsants with tranquilizing, sedative and hypnotic properties of low toxicity at high dosages are described. Representative compounds are phenyl acetyl glycine dimethylamide, the halophenyl and phenoxy analogs and other lower alkyl or cyclic amides.

---

This invention relates to chemical compounds having neurological activity.

Compounds within the scope of the present invention possess interesting neurological properties, notably anticonvulsive or analeptic activity as well as tranquilizing, sedative and hypnotic activity at high doses. Their toxicity is low and the therapeutic ratio of activity to toxicity is favorable. Certain compounds, unlike most other anticonvulsants, do not potentiate barbiturates and therefore appear to act in a novel manner. Furthermore certain compounds are potent anticonvulsants while displaying low depressant activity.

The present invention provides compounds of the general formula

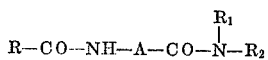

$$R-CO-NH-A-CO-N{\overset{R_1}{\underset{R_2}{}}}$$  (I)

where

R is phenyl or a substituted or unsubstituted aliphatic group carrying one or more substituted or unsubstituted phenyl, substituted or unsubstituted phenoxy, substituted or unsubstituted phenylthio or substituted or unsubstituted alicyclic groups;
$R_1$ is hydrogen or a substituted or unsubstituted hydrocarbon group or a substituted or unsubstituted heterocyclic group;
$R_2$ is a substituted or unsubstituted hydrocarbon group or a substituted or unsubstituted heterocyclic group;
$R_1$ and $R_2$ may be the same or different and may be joined together to form cyclic groups including the nitrogen atom to which they are both attached; the heterocyclic group may contain hetero atoms in addition to the said nitrogen atom, remote from or joined to it.
A is a substituted or unsubstituted straight or branched chain divalent aliphatic group;
provided that R is not 3,4,5-trimethoxystyryl when $R_1$ and $R_2$ are both ethyl and A is methylene.

As indicated above, R may be an aliphatic group carrying one or more phenyl, phenoxy or phenylthio substituents; which aliphatic group may be saturated or unsaturated and preferably has 1–5 carbon atoms. The chain may be branched or unbranched and may carry substituents for example, hydroxyl groups, ether groups, primary, secondary or tertiary amino groups, acylamide, carboxyl, carbamoyl groups, oxo or halogen atoms. R is preferably a substituted or unsubstituted benzyl group.

The group R may carry one or more substituents on the phenyl group thereof, for example, halogen atoms, e.g. chlorine, bromine, iodine or fluorine atoms hydroxy groups; ether groups, e.g. alkoxy groups, methylene dioxy groups, aralkoxy groups or aryloxy groups; alkyl, alkenyl or alkynyl groups acyloxy groups; amino groups mono- and di-substituted amino groups; acylamido groups; carboxyl groups; esterified carboxyl groups; carbamoyl groups or acyl groups. Where such substituents are aliphatic or possess an aliphatic portion, there are preferably 1–5 carbon atoms in the aliphatic chain as in methyl, propyl, amyl, allyl, propargyl, methoxy, butoxy, benzyloxy, acetoxy, propionyloxy, dimethylamino, diethylamino, acetamido, methoxycarbonyl, ethoxycarbonyl, acetyl or propionyl groups. Where aromatic groups are present, these are preferably monocyclic, as in phenyl, tolyl or benzyl groups.

$R_1$ and $R_2$ may for example be saturated or unsaturated, straight or branched aliphatic groups preferably containing 1–5 carbon atoms. Thus they may be methyl, ethyl, isopropyl butyl or allyl. $R_1$ and $R_2$ may also be for example aryl or heterocyclic groups. $R_1$ and $R_2$ may also be linked to form heterocyclic groups including the nitrogen to which they are both linked and possibly other heteroatoms, for example, piperidino, morpholino, imidazolyl, pyrollidyl or pyrazolyl.

$R_1$ and $R_2$ may be substituted for example by hydroxyl, ether groups, primary, secondary or tertiary amido, acylamido, carboxyl, oxo, carbamoyl, phenyl, heterocyclic such as furfuryl, or halogen. Fused ring substituents may also be present, for example in benzimidazolyl groups. Hydrogen, methyl, ethyl and morpholino are preferred. Where $R_1$ is hydrogen and $R_2$ is alkyl the toxicity of the compound is particularly low; where both $R_1$ and $R_2$ are alkyl groups, the toxicity is somewhat greater but the neurological activity is also enhanced.

The chain A may be straight or branched and preferably contains 1–5 carbon atoms. Substituents may be present, for example, hydroxyl, ether groups, primary, secondary or tertiary amino, acylamido, phenyl, carboxyl, carbamoyl, oxo or halogen. A is preferably a methylene group.

Where basic groups are present non-toxic acid addition salts may also be prepared.

The term lower alkyl is used herein to mean having 1-6 carbon atoms.

Compounds which are preferred for their balance of physiological properties are:

Phenylacetyl glycine dimethylamide
Phenylacetyl glycine morpholinamide
Phenoxyacetyl glycine methylamide
o-Chlorophenyl acetyl glycine dimethylamide
p-Fluorophenyl acetyl glycine ethylamide In general, the toxicities of the new compounds are low, for example of the order of 1000 mg./kg. orally in mice, while the effective oral dose for anticonvulsant, sedative and hypnotic activity is of the order of 50-200 mg./kg., lower doses giving only anticonvulsant effects while higher doses giving a hypnotic effect. The therapeutic ratio is thus excellent. In general the duration of action is relatively short which is an advantage where long term sedation or hypnosis is contra-indicated.

The compounds of Formula I as defined above may be formulated, for administration, together with a pharmaceutical carrier or excipient.

The names and formulae used herein are not intended to limit the invention to any specific optical or geometric isomers.

The compositions according to the invention may be formulated in conventional manner and are preferably in dosage unit form to facilitate prescription, for example in the form of tablets, pills, chewing gum, sachets, capsules, suppositories, ampoules of injectable liquid, etc. each dosage unit preferably contains 5-1000 mg. of the active compound, advantageously 25-500 mg. for example 100-300 mg.

The carrier in the solid oral forms may, for example include gelatin, lactose, starch, talc, magnesium stearate, hydrogenated oils, polyglycols, etc. Suppositories may contain a conventional suppository base, e.g. cocoa butter, polyglycols, etc., with or without surface active agents.

Oral formulations are preferred and with the above proviso in connection with solutions, typical oral formulations will include tablets, pills, capsules, sachets, granules, powders, chewing gum, suspensions, emulsions and solutions; particularly preferred oral formulations are tablets and capsules. Where appropriate and where necessary the formulations may include diluents, binding agents, dispersing agents, surface-active agents, lubricating agents, coating materials, flavoring agents, coloring agents, solvents, thickening agents, suspending agents, sweeteners or any other pharmaceutically acceptable additives, for example gelatin, lactose, starch, talc, magnesium stearate, hydrogenated oils, polyglycols and syrups. Where the formulations are tablets or capsules and the like they will represent pre-measured unit doses but in the case of granules, powders, suspensions and the like the formulations may be presented as pre-measured unit doses or in multi-dose containers from which the appropriate unit dose may be withdrawn.

The injectable form may be an aqueous or non-aqueous solution, suspension, or emulsion in a pharmaceutically acceptable liquid (e.g. sterile pyrogen free water or parenterally acceptable oils) or mixture of liquids which may contain bacteriostatic agents, antioxidants or other preservatives, buffers, (preferably in the physiological pH range of 6.5-7.0) solutes to render the solution isotonic with the blood, thickening agents, suspending agents, or other pharmaceutically acceptable additives. Such forms will be presented in unit dose form such as ampoules or disposable injection devices, or in multi-dose forms such as a bottle from which the appropriate dose may be withdrawn, or as a solid form or concentrate which can be used to quickly prepare an injectable formulation. All formulations for injections are preferably rendered sterile. Suppositories containing the compound will also contain suitable carriers (e.g. cocoa butter or polyglycols).

Preparations for inhalation preferably take the form of aerosols containing, for example, conventional aerosol propellants, such as fluorohydrocarbons etc.

In addition to standard pharmaceutical additives other therapeutic agents may be included with the compound, particularly other neurologically active agents.

It will be appreciated that it is not intended that the invention should include mere solutions of any known compounds in common solvents.

In general, oral preparations are preferred.

The compounds of Formula I as defined above may be prepared in any convenient way, preferably by reaction of a compound of the formula $$R.CO-NH-A-COOH \qquad (II)$$

or a reactive derivative thereof, e.g. a lower alkyl ester such as the methyl or ethyl ester, a nitrophenyl ester, an acid halide, for example the acid chloride or bromide, or an anhydride or mixed anhydride with an amine of Formula III, $NHR_1R_2$ where the acid itself is used, a dehydrating agent, e.g. a carbodiimide such as dicyclohexyl carbodiimide, should be present. Any substituents which would interfere in the reaction should be protected, e.g. by conventional methods.

Alternatively the acid of Formula II may be reacted with hydrazine (in the form of the hydrate) to form a hydrazide which is further reacted with a β-diketone or a β-ketoester to make $R_1R_2$ part of a cyclic group containing two nitrogen atoms.

The compounds of Formula II as defined above may be prepared in any convenient way, preferably by reaction of an acid of formula $$H_2N-A-COOH \qquad (IV)$$

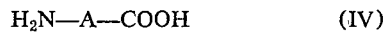

or an appropriate derivative thereof (e.g. an ester or alkali metal salt) with an acid of formula $$R.COOH \qquad (V)$$

or a reactive derivative thereof such as an acid halide, e.g. the chloride or bromide, an anhydride or mixed anhydride or an ester with an alcohol or phenyl e.g. an ethyl or methyl ester of a nitrophenyl ester. Where the R.COOH acid itself is used, a dehydrating agent should be present, e.g. a carbodiimide such as dicyclohexyl carbodiimide. Where an R.COOH acid halide is used, an acid binding agent such as an organic or inorganic base is preferably present. The choice of an appropriate derivative of the $H_2N-A-COOH$ acid will be evident to one skilled in the art and will depend upon whether the OH group needs protection in which case an ester may be used or not in which case the acid or salt may be used.

This method can lead to esters of the acid of Formula II. When it is desired to use the free acid, the initial ester may be optionally converted to the acid e.g. by hydrolysis under basic conditions; if desired the free acid may be converted to a further reactive derivative e.g. an ester by conventional methods. It is usually more convenient however, to react the ester initially produced in the subsequent reaction with the compound of Formula III.

The following examples are given by way of illustration only:

EXAMPLE 1

Synthesis of phenyl acetyl glycine dimethyl amide 20.2 gms. triethylamine (0.2 m.) in 25 mls. methylene chloride was added, with stirring to 27.5 gms. phenyl acetic acid (0.2 m.) and 27.9 gms. of glycine ethyl ester hydrochloride (0.2 m.) in 150 mls. methylene chloride. One minute after the addition of the amine 41.2 gms. N,N'-dicyclohexylcarbodiimide (0.2 m.) in 50 mls. methylene chloride was added to the reaction mixture. The reaction mixture was cooled such that the temperature did not exceed 30° C. After stirring for six hours and standing for 12 hours the reaction mixture was filtered and the filtrate diluted with 150 mls. methylene chloride. This solution was extracted with 50 mls. water, 50 mls. 2 N HCl, 50 mls. water, 50 mls. saturated sodium bicarbonate and then twice with 50 mls. water. The solution was dried over magnesium sulphate, the solvent stripped off and the residue recrystallized twice from ethanol. This gave phenyl acetyl glycine ethyl ester: Yield 28 gms. 63.5% M.P.T. 78–79° C. Holter J. Pr. Chem. (2) 38, 107 gives M.P.T. 79° C.

*Analysis.*—Nitrogen: Found (percent): 6.65. Calculated (percent): 6.35.

10 gms. phenyl acetyl glycine ethyl ester (0.045 m.) were sealed up in a pressure bottle with 200 mls. 33% dimethyl amine in alcohol for six days. The solvent was then stripped off and the product recrystallized twice from petroleum ether 60–80. This gave phenyl acetyl glycine dimethylamide: Yield 1.8 gms. 18% M.P.T. 94° C.

*Analysis.*—Nitrogen: Found (percent): 12.50. Calculated (percent): 12.72.

EXAMPLE 2

(A) Phenoxy acetyl glycine ethyl ester 10.1 g. triethylamine in 10 mls. dry methylene chloride was added to a stirred mixture of 15.2 g. phenoxy acetic acid and 13.95 g. glycine ethyl ester hydrochloride. 30 seconds later 20.6 g. N,N-dicyclohexyl carbodiimide in 20 mls. methylene chloride was added to the reaction mixture which was cooled to keep the temperature under 38° C. The reaction mixture was stirred for 8 hours and then filtered. The filtrate was washed with (1) 30 mls. water, (2) 30 mls. 2 N HCl, (3) 30 mls. water, (4) 30 mls. saturated aqueous NaHCO₃, (5) 2× 30 mls. water and then dried over MgSO₄. The solvent was stripped off and the residue taken up in benzene; petroleum ether 60–80 was added and the product allowed to crystallize out. Yield 15.2 g. 64% M.P. 54–55° C.

(B) Phenoxy acetyl glycine dimethylamide 10 g. phenoxy acetyl glycine ethyl ester were sealed up in a pressure bottle with 200 mls. 33% dimethylamide in ethanol and allowed to stand for 5 days. The solvent was distilled off and the residue crystallized out. This residue was recrystallized twice from ethanol. Yield 6.2 g. 62% M.P. 126–127° C.

EXAMPLE 3

Synthesis of phenyl acetyl glycine morpholinamide 60 g. phenyl acetyl chloride and 12 g. NaOH in 30 mls. water were added simultaneously to a mixture of 22.5 glycine and 12 g. NaOH in 100 mls. water at 10° C. over a period of one hour. Stirring was continued for a further hour, the solution extracted with ether and then acidified with concentrated HCl. The solid was filtered off and recrystallized twice from 75% ethanol.

Phenyl acetyl glycine: Yield 27 g. 46.5% M.P.T. 143° C.

7.9 gms. phosphorus tribromide (0.029 m.) were added to a solution of 5.6 gms. phenyl acetyl glycine (0.029 m.) in 70 mls. dry dioxane at room temperature and the mixture stirred for 2 hours during which precipitation of a white solid occurred. The reaction mixture was centrifuged, the dioxan decanted off, the solid suspended in ether and the centrifugation repeated. The solid material was washed with ether three times using this method. The solid was then suspended in ether and 2.3 gms. dry pyridine (0.029 m.) in 20 mls. ether added. The pyridine hydrobromide was filtered off and 2.5 gms. morpholine (0.029 m.) in 20 mls. ether added to the filtrate. The reaction mixture was allowed to stand for 6 hours the ether evaporated off and the residue recrystallized twice from ethanol.

Phenyl acetyl glycine morpholinamide: Yield 2.3 gms. 31% M.P.T. 174° C.

*Analysis.*—Nitrogen: Found (percent): 10.76. Calculated (percent): 10.68.

EXAMPLE 4

Synthesis of p-fluoro-phenyl acetyl glycine ethyl amide 5.1 gms. triethylamine (0.052 m.) in 15 mls. methylene chloride was added, with stirring to 8.2 gms. p-fluorophenyl acetic acid (0.052 m.) and 7.2 gms. glycine ethyl ester hydrochloride (0.052 m.) in 70 mls. methylene chloride. One minute after the addition of the amine 10.6 gms. N,N-dicyclohexylcarbodiimide (0.052 m.) in 20 mls. methylene chloride were added to the reaction mixture. The reaction mixture was cooled such that the temperature did not exceed 30° C. After stirring for six hours and standing for 12 hours the reaction mixture was filtered and the filtrate diluted with 150 mls. methylene chloride. This solution was extracted with 50 mls. water, 50 mls. 2 N HCl, 50 mls. water, 50 mls. saturated sodium bicarbonate and then twice with 50 mls. water. The solution was dried over magnesium sulphate, the solvent stripped off and the residue recrystallized twice from alcohol.

This gave p-fluorophenyl acetyl glycine ethyl ester: Yield 7.1 gms. 57% M.P.T. 76–78° C.

7.1 gms. p-fluorophenyl acetyl glycine ethyl ester (0.029 m.) were sealed up in a pressure bottle with 200 mls. 30% ethylamine in alcohol for six days. The solvent was then stripped off and the product recrystallized twice from alcohol.

This gave p-fluorophenyl acetyl glycine ethyl amide. Yield 3.9 gms. 29% M.P.T. 183–184° C.

*Analysis.*—Nitrogen: Found (percent): 11.72. Calculated (percent): 11.76.

EXAMPLE 5

Synthesis of phenyl acetyl glycine 3,5-dimethyl pyrazolide 21 gms. phenyl acetyl glycine ethyl ester (0.95 m.) (prepared as in Example 1) were dissolved in 60 mls. ethanol, 7.5 gms. hydrazine hydrate (0.15 m.) added and the mixture left to stand overnight. The solvent was removed and the product recrystallized from ethanol.

Phenyl acetyl glycine hydrazide: Yield 12.4 gms. 63%, M.P.T. 167° C.

*Analysis.*—Nitrogen: Found (percent): 20.20. Calculated (percent): 20.28.

6.2 gms. phenyl acetyl glycine hydrazide (0.030 m.) and 3.2 gms. acetyl acetone (0.032 m.) in 30 mls. ethanol were refluxed 3 hours. The solvent was removed and the residue crystallized by the addition of Petroleum Ether 60–80. The product was recrystallized twice from Petroleum Ether 60–80.

Phenyl acetyl glycine 3,5-dimethyl pyrazolide: Yield 4.2 gms. 44% M.P.T. 108–109° C.

*Analysis.*—Nitrogen: Found (percent): 14.93. Calculated (percent): 15.49.

The following table gives details of a number of further compounds according to the invention which were prepared by methods similar to those described in the previous examples.

TABLE

| Ex. No. | Name | Formula | Yield, percent | Molecular formula | Nitrogen, percent calcd. | Analysis, percent found | Melting point, °C. | Recrystal-lization solvent |
|---|---|---|---|---|---|---|---|---|
| 6 | Phenyl acetyl glycine methyl amide | PhCH₂CONHCH₂CON⟨Me/H | 18 | C₁₁H₁₄N₂O₂ | 13.58 | 13.36 | 156-167 | Ethanol. |
| 7 | Phenyl acetyl alanine methyl amide | PhCH₂CONH(CH₂)₂CON⟨Me/H | 16 | C₁₂H₁₆N₂O₂ | 12.72 | 12.35 | 263 | Alcohol. |
| 8 | Phenyl acetyl 4-amino butyric acid methyl amide | PhCH₂CONH(CH₂)₃CON⟨Me/H | 8 | C₁₃H₁₈N₂O₂ | 11.96 | 11.79 | 217 (d) 235 | Do. |
| 9 | Phenyl acetyl DL alanine methyl amide | PhCH₂CONHCH(CH₃)—CON⟨Me/H | 26 | C₁₂H₁₆N₂O₂ | 12.72 | 12.38 | 198-200 | Do. |
| 10 | Phenyl acetyl L alanine methyl amide | PhCH₂CONHCH(CH₃)—CON⟨Me/H | 18 | C₁₂H₁₆N₂O₂ | 12.72 | 12.35 | 264 (d) 269 | Do. |
| 11 | Benzoyl glycine methyl amide | PhCONHCH₂CON⟨Me/H | 21 | C₁₀H₁₂N₂O₂ | 14.58 | 14.60 | 164-165 | Alcohol. |
| 12 | Benzoyl glycine dimethyl amide | PhCONHCH₂CON(Me)₂ | 16 | C₁₁H₁₄N₂O₂ | 13.58 | 13.84 | 157 | Benzene. |
| 13 | Phenyl propionyl glycine methyl amide | Ph(CH₂)₂CONHCH₂CON⟨Me/H | 8 | C₁₂H₁₆N₂O₂ | 12.72 | 12.45 | 134-138 | Pet. Ether 60-84. |
| 14 | Diphenyl acetyl glycine methyl amide | Ph₂CHCONHCH₂CON⟨Me/H | 22 | C₁₇H₁₈N₂O₂ | 9.92 | 10.01 | 224 | Alcohol. |
| 15 | Diphenylacetyl glycine dimethylamide | Ph₂CHCONHCH₂CON(Me)₂ | 20 | C₁₈H₂₀N₂O₂ | 9.45 | 9.25 | 127-128 | Do. |
| 16 | Phenyl acetyl glycine ethylamide | PhCH₂CONHCH₂CON⟨Et/H | 18 | C₁₂H₁₆N₂O₂ | 12.72 | 12.85 | 170-171 | Do. |
| 17 | Phenyl acetyl glycine n-propylamide | PhCH₂CONHCH₂CON⟨Prⁿ/H | 21 | C₁₃H₁₈N₂O₂ | 11.96 | 11.83 | 189 | Do. |
| 18 | Phenyl acetyl glycine iso-propylamide | PhCH₂CONHCH₂CON⟨Prⁱˢᵒ/H | 26 | C₁₃H₁₈N₂O₂ | 11.96 | 12.15 | 156 | Do. |

TABLE—Continued

| Ex. No. | Name | Formula | Yield, percent | Molecular formula | Nitrogen, percent calcd. | Analysis, percent found | Melting point, °C. | Recrystallization solvent |
|---|---|---|---|---|---|---|---|---|
| 19 | Phenyl acetyl glycine n-butylamide | PhCONHCH₂CON(Buⁿ)(H) | 30 | C₁₂H₁₈N₂O₂ | 11.28 | 11.10 | 173–174 | Alcohol. |
| 20 | Cinnamoyl glycine methyl amide | PhCH:CHCONHCH₂CON(Me)(H) | 25 | C₁₂H₁₄N₂O₂ | 12.84 | 12.59 | 219–221 | Do. |
| 21 | Phenyl acetyl glycine ethanolamide | PhCH₂CONHCH₂CON(CH₂CH₂OH)(H) | 22 | C₁₂H₁₆N₂O₃ | 11.86 | 11.85 | 145 | Do. |
| 22 | Phenyl acetyl glycine diallylamide | PhCH₂CONHCH₂CON(CH₂CH:CH₂)₂ | 12 | C₁₆H₂₀N₂O₂ | 10.29 | 9.82 | 79 | Do. |
| 23 | p-Chlorophenylacetyl glycine methylamide | pClPhCH₂CONHCH₂CON(Me)(H) | 31 | C₁₁H₁₃N₂O₂Cl | 11.60 | 11.01 | 208–209 | Do. |
| 24 | p-Chlorophenylacetyl glycine dimethylamide | pClPhCH₂CONHCH₂CON(Me)(Me) | 22 | C₁₂H₁₅N₂O₂Cl | 11.02 | 10.62 | 140–141 | Do. |
| 25 | Phenyl acetyl glycine N-methyl N-(2-hydroxyethyl)amide | PhCH₂CONHCH₂CON(Me)(CH₂CH₂OH) | 41 | C₁₃H₁₈N₂O₃ | 11.20 | 11.45 | (¹) | |
| 26 | Phenyl acetyl glycine (2-furfuryl methyl) amide | PhCH₂CONHCH₂CON(H)(CH₂-furfuryl) | 25 | C₁₃H₁₄N₂O₃ | 10.29 | 10.22 | 194–150 | Do. |
| 27 | o-Chlorophenylacetyl glycine ethyl amide | o-ClPhCH₂CONHCH₂CON(Et)(H) | 15 | C₁₂H₁₅N₂O₂Cl | 11.00 | 11.05 | 150 | Do. |
| 28 | o-Chlorophenyl acetyl glycine dimethyl amide | o-ClPhCH₂CONHCH₂CON(Me)(Me) | 96 | C₁₂H₁₅N₂O₂Cl | 11.00 | 11.14 | (¹) | |
| 29 | Phenyl acetyl glycine benzimidazolide | PhCH₂CONHCH₂CON-benzimidazole | 38 | C₁₇H₁₅N₃O₂ | 14.33 | 14.18 | 134–137 | Do. |
| 30 | Phenyl acetyl glycine N-methyl N-benzyl amide | PhCH₂CONHCH₂CON(Me)(CH₂Ph) | 26 | C₁₈H₂₀N₂O₂ | 9.46 | 9.55 | 112–113 | Do. |

TABLE—Continued

| Ex. No. | Name | Formula | Yield, percent | Molecular formula | Nitrogen, percent calcd. | Analysis, percent found | Melting point, °C. | Recrystallization solvent |
|---|---|---|---|---|---|---|---|---|
| 31 | Phenyl acetyl glycine (3-hydroxy piperidine) amide | PhCH₂CONHCH₂CON—⟨ ⟩—OH | 28 | C₁₅H₂₀N₂O₃ | 10.14 | 10.32 | 124–125 | Alcohol. |
| 32 | Phenyl acetyl glycine (3-pyridyl) amide | PhCH₂CONHCH₂CON—H / ⟨N⟩ | 30 | C₁₅H₁₅N₃O₂ | 15.61 | 15.57 | 161–162 | Do. |
| 33 | Phenyl acetyl glycine pyrrolidine amide | PhCH₂CONHCH₂CON—⟨ ⟩ | 28 | C₁₄H₁₈N₂O₂ | 11.57 | 11.53 | 48–99 | Do. |
| 34 | Phenyl acetyl glycine (2-ethyl piperidine) amide | PhCH₂CONHCH₂CON—⟨Et⟩ | 35 | C₁₇H₂₄N₂O₂ | 9.72 | 10.02 | 165–166 | Do. |
| 35 | Phenyl acetyl glycine (2-phenyl piperidine) amide | PhCH₂CONHCH₂CON—⟨Ph⟩ | 11 | C₂₁H₂₄N₂O₃ | 8.33 | 8.42 | 164–165 | Do. |
| 36 | Phenyl acetyl glycine N(N'benzyl piperidine) amide | PhCH₂CONHCH₂CON—⟨N—CH₂Ph⟩ | 43 | C₂₁H₂₅N₃O₂ | 11.96 | 11.63 | 164 | Do. |
| 37 | m-Methoxy phenyl acetyl glycine ethyl amide | m-MeO PhCH₂CONHCH₂CON—Et / H | 26 | C₁₃H₁₈N₂O₃ | 11.28 | 11.13 | 134 | Do. |
| 38 | Phenyl acetylamino isobutyric acid methyl amide | PhCH₂CON—H / Me, C(Me)(Me)—CON—H / Me | 28 | C₁₃H₁₈N₂O₂ | 11.96 | 11.85 | 116–118 | Do. |
| 39 | Phenyl acetyl α phenyl glycine methyl amide | PhCH₂CONHCH(Ph)CON—Me / H | 33 | C₁₇H₁₈N₂O₂ | 9.92 | 9.97 | 230 | Do. |
| 40 | Cinnamoyl glycine dimethyl amide | PhCH:CHCONHCH₂CON—Me / Me | 36 | C₁₃H₁₆N₂O₂ | 12.06 | 12.48 | 137 | Do. |
| 41 | Cinnamoyl glycine isopropyl amide | PhCH:CHCONHCH₂CON—iso-Pr / H | 39 | C₁₄H₁₈N₂O₂ | 11.37 | 11.28 | 192 | Do. |
| 42 | Cyclo hexyl acetyl glycine ethyl amide | ⟨ ⟩—CH₂CONHCH₂CON—Et / H | 42 | C₁₂H₂₂N₂O₂ | 12.38 | 12.39 | 149–150 | Do. |

TABLE—Continued

| Ex. No. | Name | Formula | Yield, percent | Molecular formula | Nitrogen, percent calcd. | Analysis, percent found | Melting point, °C. | Recrystallization solvent |
|---|---|---|---|---|---|---|---|---|
| 43 | Cyclo hexyl acetyl glycine dimethyl amide | C₆H₁₁CH₂CONHCH₂CON(Me)₂ | 36 | C₁₂H₂₂N₂O₂ | 12.38 | 12.42 | 108–110 | Alcohol. |
| 44 | p Hydroxy phenyl acetyl glycine dimethyl amide | PhCHCONHCH₂CON(Me)₂ with OH | 26 | C₁₂H₁₆N₂O₃ | 11.86 | 12.01 | 132–133 | Do. |
| 45 | 3,4 dimethoxy phenyl acetyl glycine dimethyl amide | MeO-C₆H₃(OMe)-CH₂CONHCH₂CON(Me)₂ | 29 | C₁₄H₂₀N₂O₄ | 9.99 | 10.07 | 79–80 | Do. |
| 46 | p-Fluoro phenyl acetyl glycine dimethyl amide | pFPhCH₂CONHCH₂CON(Me)₂ | 19 | C₁₂H₁₅N₂O₂F | 11.76 | 11.88 | 133–134 | Do. |
| 47 | Phenyl acetyl glycine (3-methyl pyrazol-5-one) | PhCH₂CONHCH₂CON(pyrazolone) | 41 | C₁₄H₁₅N₃O₃ | 15.38 | ......... | 138–139 | Pet. ether, 60–80. |
| 48 | Phenyl acetyl glycine piperidide | PhCH₂CONHCH₂CON(piperidine) | 36 | C₁₅H₂₀N₂O₂ | 10.77 | 10.62 | 163–164 | Alcohol. |
| 49 | Phenyl acetyl glycine (4-hydroxy 4-phenyl piperidine) amide | PhCH₂CONHCH₂CON(4-OH-4-Ph-piperidine) | 23 | C₁₁H₂₄N₂O₃ | 7.95 | 8.23 | 123–125 | Do. |
| 50 | Phenoxy acetyl glycine methyl amide | PhOCH₂CONHCH₂CON(Me)(H) | 70 | C₁₁H₁₄N₂O₃ | 12.61 | 13.03 | 153 | Do. |
| 51 | Phenoxy acetyl glycine dimethyl | PhOCH₂CONHCH₂CON(Me)₂ | 62 | C₁₂H₁₆N₂O₃ | 11.86 | 11.90 | 126–127 | Do. |
| 52 | o-Chlorophenoxy acetyl glycine methyl amide | o-ClPhOCH₂CONHCH₂CON(Me)(H) | 64 | C₁₁H₁₃N₂O₃Cl | 10.91 | 10.96 | 154–155 | Do. |
| 53 | o-Chlorophenoxy acetyl glycine dimethyl amide | o-ClPhOCH₂CONHCH₂CON(Me)₂ | 61 | C₁₂H₁₅O₃N₂Cl | 10.35 | 10.59 | 118.5–119.5 | Do. |

TABLE—Continued

| Ex. No. | Name | Formula | Yield, percent | Molecular formula | Nitrogen, percent calcd. | Analysis, percent found | Melting point, °C. | Recrystallization solvent |
|---|---|---|---|---|---|---|---|---|
| 54 | p-Chlorophenoxy acetyl glycine methyl amide | p-ClPhOCH₂CONHCH₂CON(Me)(H) | 52 | C₁₁H₁₃N₂O₃Cl | 10.91 | 10.80 | 195–197 | Alcohol. |
| 55 | p-Chlorophenoxy acetyl glycine dimethyl amide | p-ClPhOCH₂CONHCH₂CON(Me)(Me) | 45 | C₁₂H₁₅N₂O₃Cl | 10.35 | 10.50 | 117–119 | Do. |
| 56 | 2,4-dichlorophenoxy acetyl glycine methyl amide | 2,4ClPhOCH₂CONHCH₂CON(Me)(H) | 56 | C₁₁H₁₂N₂O₃Cl₂ | 9.62 | 9.52 | 168 | Do. |
| 57 | 2,4-dichlorophenoxy acetyl glycine dimethyl amide | 2,4ClPhOCH₂CONHCH₂CON(Me)(Me) | 55 | C₁₂H₁₄N₂O₃Cl₂ | 9.18 | 9.04 | 143–145 | Do. |
| 58 | o-Methoxyphenoxy acetyl glycine methyl amide | o-MeOPhOCH₂CONHCH₂CON(Me)(H) | 47 | C₁₂H₁₆N₂O₄ | 11.02 | 11.20 | 107–108 | Do. |
| 59 | o-Methoxyphenoxy acetyl glycine dimethyl amide | o-MeOPhOCH₂CONHCH₂CON(Me)(Me) | 41 | C₁₃H₁₈N₂O₄ | 10.52 | 10.50 | 97–98 | Do. |
| 60 | p-Ethoxy phenoxy acetyl glycine methyl amide | p-EtOPhOCH₂CONHCH₂CON(Me)(H) | 35 | C₁₃H₁₈N₂O₄ | 10.52 | | 172 | Do. |
| 61 | p-Ethoxy phenoxy acetyl glycine dimethyl amide | p-EtOPhOCH₂CONHCH₂CON(Me)(Me) | 26 | C₁₄H₂₀N₂O₄ | 10.00 | | 119–120 | Do. |
| 62 | p-Methoxyphenoxy acetyl glycine dimethylamide | pMeOPhOCH₂CONHCH₂CON(Me)(Me) | 57 | C₁₃H₁₈N₂O₄ | 10.52 | 10.57 | 118–119 | Do. |
| 63 | Phenoxy acetyl glycine isopropylamide | PhOCH₂CONHCH₂CON(H)(CH(CH₃)₂) | 62 | C₁₃H₁₈O₃N₂ | 11.19 | 11.07 | 149–151 | Do. |
| 64 | m-N,N dimethylaminophenoxy acetyl glycine methylamide | m-N(CH₃)₂PhOCH₂CONHCH₂CON(Me)(H) | 69 | C₁₃H₁₉N₃O₃ | 15.84 | 15.98 | 122–123 | Do. |
| 65 | m-N,N dimethylaminophenoxy acetyl glycine dimethylamide | m-N(CH₃)₂PhOCH₂CONHCH₂CON(Me)(Me) | 55 | C₁₄H₂₁N₃O₃ | 15.05 | 15.10 | 111–112 | Do. |

TABLE—Continued

| Ex. No. | Name | Formula | Yield, percent | Molecular formula | Nitrogen, percent calcd. | Analysis, percent found | Melting point, °C. | Recrystallization solvent |
|---|---|---|---|---|---|---|---|---|
| 66 | m-tert Butylphenoxy acetyl glycine methylamide | m-C[CH₃]₃PhOCH₂CONHCH₂CON(H)(Me) | 59 | C₁₅H₂₂N₂O₃ | 10.06 | 10.59 | 136–137 | Alcohol. |
| 67 | m-tert Butylphenoxy acetyl glycine dimethylamide | m-C[CH₃]₃PhOCH₂CONHCH₂CON(Me)(Me) | 6 | C₁₆H₂₄N₂O₃ | 9.58 | 10.05 | 110–111 | Do. |
| 68 | m-Methylphenoxy acetyl glycine methylamide | m-CH₃PhOCH₂CONHCH₂CON(H)(Me) | 68 | C₁₂H₁₆N₂O₃ | 11.86 | 12.31 | 112–114 | Do. |
| 69 | m-Methylphenoxy acetyl glycine dimethylamide | m-CH₃PhOCH₂CONHCH₂CON(Me)(Me) | 52 | C₁₃H₁₈N₂O₃ | 11.19 | 11.51 | 96–97 | Do. |
| 70 | αPhenoxy propionyl glycine methylamide | PhOCH[CH₃]CONHCH₂CON(H)(Me) | 63 | C₁₂H₁₆N₂O₃ | 11.86 | 12.50 | 105–106 | Do. |
| 71 | αPhenoxy propionyl glycine dimethylamide | PhOCH[CH₃]CONHCH₂CON(Me)(Me) | 54 | C₁₃H₁₈N₂O₃ | 11.19 | 11.50 | 80–81 | Do. |
| 72 | Mercaptophenyl acetyl glycine methylamide | PhSCH₂CONHCH₂CON(H)(Me) | 60 | C₁₁H₁₄N₂O₂S | 11.76 | 11.83 | 149 | Do. |
| 73 | Mercaptophenyl acetyl glycine dimethylamide | PhSCH₂CONHCH₂CON(Me)(Me) | 55 | C₁₂H₁₆N₂O₂S | 11.11 | 10.56 | Oil | Do. |
| 74 | Mercaptophenyl acetyl glycine ethylamide | PhSCH₂CONHCH₂CON(H)(Et) | 49 | C₁₂H₁₆N₂O₂S | 11.11 | 11.11 | 142–144 | Do. |

[1] Low melting oil.

What is claimed is:
1. Phenyl acetyl glycine dimethyl amide.
2. o-Chlorophenyl acetyl glycine dimethyl amide.
3. p-Fluorophenyl acetyl glycine ethyl amide.
4. Phenyloxy acetyl glycine dimethyl amide.

References Cited

UNITED STATES PATENTS

| | | | |
|---|---|---|---|
| 3,415,880 | 12/1968 | Loeu | 260—558 |
| 3,382,243 | 5/1968 | Bell et al. | 260—562 |

FOREIGN PATENTS

| | | | |
|---|---|---|---|
| 43/9541 | 4/1968 | Japan | 260—558 |
| 387,010 | 4/1965 | Switzerland | 260—558 |
| 752,692 | 7/1956 | England | 260—558 |

OTHER REFERENCES

Maslova et al.: J. Org. Chem. of the USSR, vol. 1, pp. 339–42 (1963).

Ruhlmann et al.: J. Prakt. Chemie, vol. 18, pp. 131–40 (1962).

Ugi et al.: Berichte, vol. 97, pp. 2996–3007 (1964).

Kjaer: Acta Chem. Scandinavia, vol. 6, pp. 1374–83 (1952).

Chemical Abstracts: Cornforth article, vol. 49, col. 3137–41 (1955); Satoda et al. article, vol. 58, col. 471–42 (1963); Japanese patent 8276 (1962) abstract, vol. 59, col. 8661 (1963); Hungarian patent 151,528 abstract, vol. 61, col. 13250 (1964).

HENRY R. JILES, Primary Examiner

H. I. MOATZ, Assistant Examiner

U.S. Cl. X.R.

260—247.2 A, 268 C, 295.5 A, 309.2, 310 R, 310 A, 326.3, 347.3, 557 R, 559 A; 424—248, 250, 263, 268, 269, 274, 285, 324, 309, 293.76